(12) United States Patent
Rutter

(10) Patent No.: US 6,207,294 B1
(45) Date of Patent: Mar. 27, 2001

(54) SELF-SHARPENING, LAMINATED CUTTING TOOL AND METHOD FOR MAKING THE TOOL

(76) Inventor: Philip A. Rutter, R.R. 1, Box 141, Canton, MN (US) 55922-9740

(*) Notice: Subject to any disclaimer, the term of this patent is extended or adjusted under 35 U.S.C. 154(b) by 0 days.

(21) Appl. No.: 09/302,354

(22) Filed: Apr. 30, 1999

(51) Int. Cl.[7] .............................. B26B 9/00; B23K 20/08; B32B 3/24
(52) U.S. Cl. .......................... 428/609; 428/614; 428/627; 30/345; 30/348; 30/350; 30/351; 228/165; 228/170; 228/190
(58) Field of Search ............................... 30/345, 351, 350, 30/348; 76/DIG. 6, DIG. 11; 241/291; 428/609, 614, 627; 228/107, 170, 165, 190

(56) References Cited

U.S. PATENT DOCUMENTS

| | | |
|---|---|---|
| 222,711 | 12/1879 | Lane . |
| 312,485 * | 2/1885 | Makin .................................. 428/614 |
| 561,409 | 5/1896 | Mann . |
| 1,414,997 | 4/1922 | Zinn . |
| 1,607,083 * | 11/1926 | Ignatieff .............................. 228/190 |
| 1,956,233 * | 4/1934 | Braun .................................. 428/609 |
| 2,087,051 | 7/1937 | Stargardter . |
| 2,160,559 | 5/1939 | Orr, Jr. . |
| 2,179,888 * | 11/1939 | Green .................................. 428/614 |
| 2,335,249 | 11/1943 | Hawkins . |
| 3,205,574 * | 9/1965 | Brennecke ........................... 228/107 |
| 3,411,208 | 11/1968 | Malm . |
| 3,488,844 | 1/1970 | Leah ..................................... 30/350 |
| 3,681,846 | 8/1972 | Gerber ................................. 30/555 |
| 3,772,955 | 11/1973 | Pearl .................................... 83/746 |
| 3,802,078 | 4/1974 | Denes ................................... 30/350 |
| 3,844,019 * | 10/1974 | Shwayder et al. .................. 428/614 |
| 3,856,480 | 12/1974 | Johnson et al. ....................... 29/195 |
| 3,975,891 * | 8/1976 | Gunther ............................... 30/350 |
| 4,283,464 * | 8/1981 | Hascoe ................................ 428/614 |
| 4,399,611 * | 8/1983 | Maringer ............................. 30/350 |
| 4,653,373 | 3/1987 | Gerber ................................. 83/697 |
| 4,881,430 * | 11/1989 | Hubbard .............................. 228/190 |
| 4,896,424 | 1/1990 | Walker ................................. 30/349 |
| 5,151,777 * | 9/1992 | Akin et al. ........................... 357/81 |
| 5,256,496 | 10/1993 | Kluczynski ......................... 428/661 |
| 5,358,795 * | 10/1994 | Nakamura et al. ................. 428/614 |
| 5,815,790 * | 9/1998 | Billgren et al. ..................... 419/5 |
| 5,910,377 * | 6/1999 | Tsukamoto et al. ................ 428/609 |
| 6,045,927 * | 4/2000 | Nakanishi et al. .................. 428/614 |
| 6,074,764 * | 6/2000 | Takayasu ............................ 428/609 |

FOREIGN PATENT DOCUMENTS 0 842 766 A1  4/1996 (EP) .

OTHER PUBLICATIONS

"Explosive Welding Engineering and Design Basics" flyer from High Energy Metals, Inc. (Mar. 12, 1998).
"Explosion Welding" flyer from High Energy Metals, Inc. (No date).

* cited by examiner

Primary Examiner—John J. Zimmerman
(74) Attorney, Agent, or Firm—John R. Wahl; Merchant & Gould PC

(57) ABSTRACT

An explosive laminated cutting tool which provides a self sharpening edge. The improved cutting tool s preferably comprised of two softer metals adhered to a hard central layer forming the cutting edge, with the central layer being made of such a material as tungsten carbide. The central laminate layer is preferably perforated to allow the outer layers to fuse through the perforations to adhere to one another, thus creating a strongly bonded laminated cutting structure which may be self sharpening. A method for manufacturing the cutting tool is also described. Another embodiment comprises a laminate wherein one of the layers has a plurality of recesses in the surface facing another layer. The recesses are filled with particles such as tungsten carbide or diamond. When the layers are explosively welded together, the particles are fused in the weld area.

6 Claims, 5 Drawing Sheets

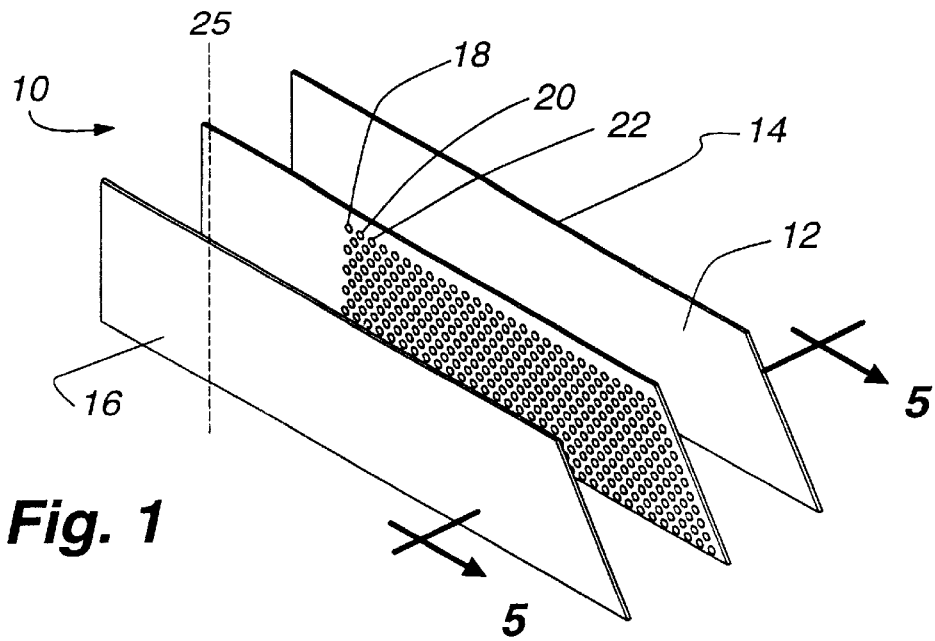
Fig. 1
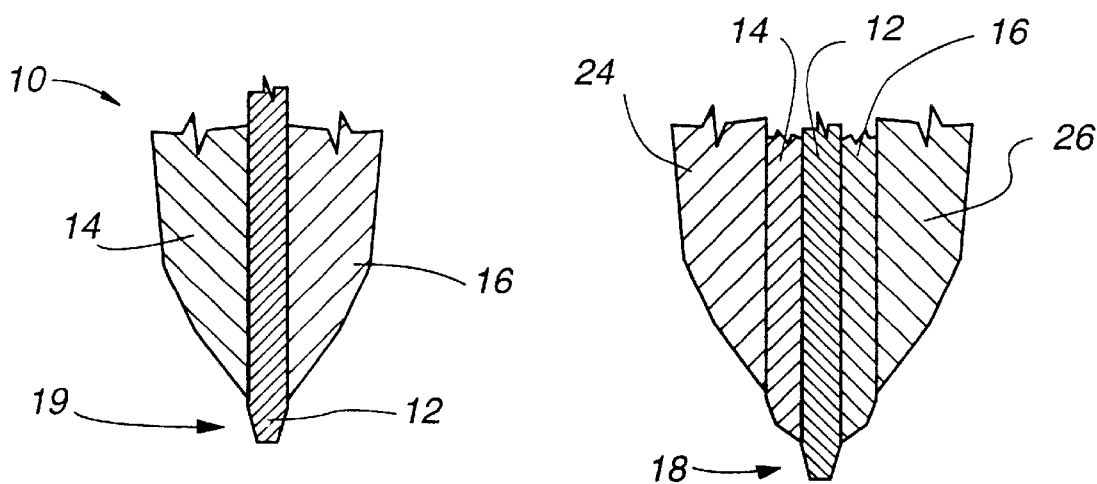
Fig. 2   Fig. 3
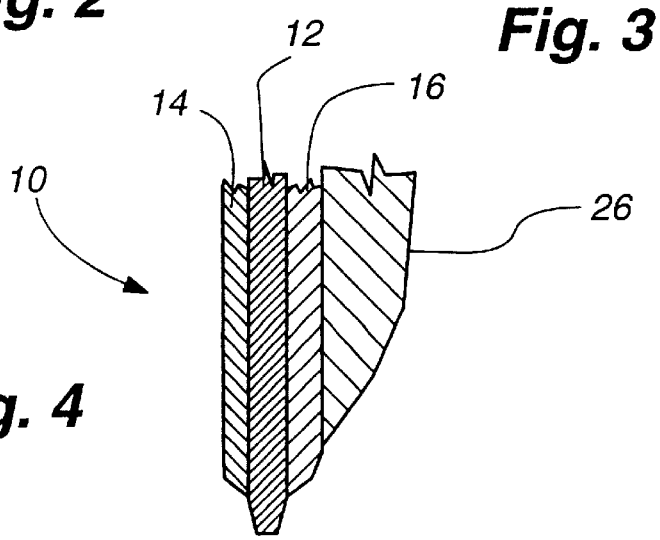
Fig. 4

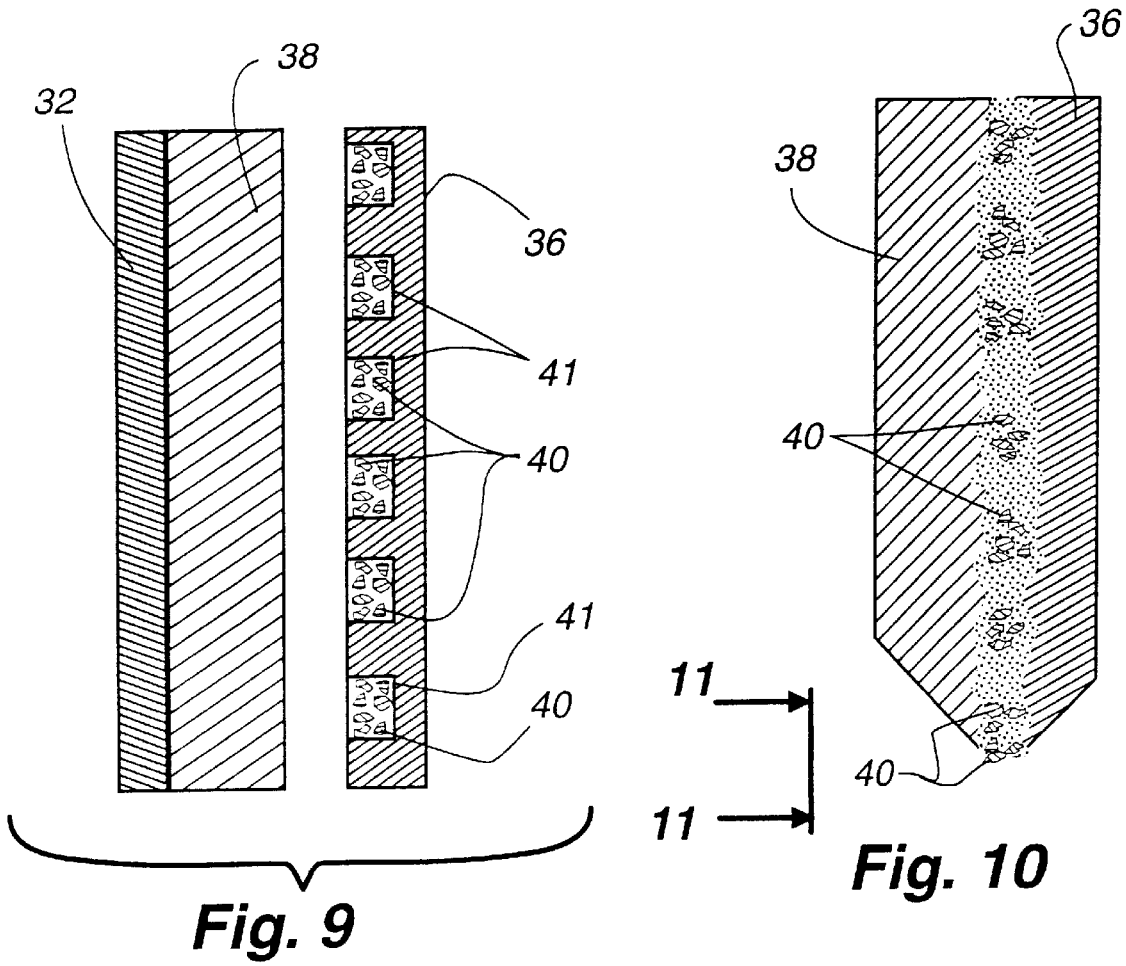
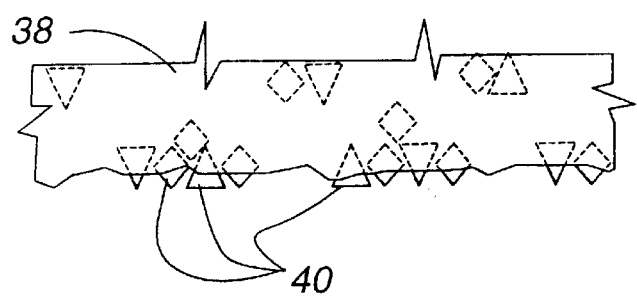

SELF-SHARPENING, LAMINATED CUTTING TOOL AND METHOD FOR MAKING THE TOOL

FIELD OF THE INVENTION

The present invention relates to a self-sharpening cutting tool. More specifically, it relates to a laminated cutting tool or knife blade which has improved laminate strength and continues to stay sharp as it is used.

BACKGROUND OF THE INVENTION

Knives, blades and cutting edge tools have traditionally been made of an essentially uniform material which is typically hardened for cutting purposes. The hardening usually occurs through known heat tempering.

Historically, blacksmiths forged axes by folding softer iron around an iron mold and hammer welding a steel insert between the two iron sides so the steel formed the actual cutting edge. This gave a superior cutting edge and conserved the most expensive steel. Other blades such as samurai blades use methods of incorporating a soft and hard alloy to gain the benefits of both. An example of a knife blade construction utilizing an outer layer of a soft material and an inner layer of a hard material is found in U.S. Pat. No. 3,681,846. In this patent an outer layer of steel or aluminum encases an inner layer of a relatively hard material such as tungsten carbide. Another patent disclosing a laminated knife blade is shown in U.S. Pat. No. 5,256,496. In this patent a titanium-high carbon steel laminate is made with an outer layer of titanium encasing an inner steel blade.

One of the major problems with laminating hard alloy metals is securing the metals together. Delamination of the metals at the interface between the dissimilar metals often results when the laminated cutting tool is put to use. This delamination results in an inferior product and could also result in a safety hazard.

There is a need for a cutting tool which successfully employs a laminated structure.

There is a need for a cutting tool which can be easily laminated without fear of delamination.

There is a need for a cutting tool which sharpens itself constantly via the processes of normal use and wear.

Finally, there is a need for a method which can successfully adhere multiple alloys together to form a self-sharpening tool.

SUMMARY OF THE INVENTION

The present invention comprises a laminated cutting tool so constructed as to be perpetually self-sharpening through the processes of normal wear and use. Two different manufacturing processes, both novel, are presented to achieve this goal, both resulting in the extensive welding or bonding of metal to metal and particularly like metal to like metal, to achieve a tool sufficiently strong to withstand the fatigue of heavy use and potential loss of tool strength resulting from corrosive processes between unlike metal laminations.

In the simplest form of the first process, the present invention utilizes a hard inner metal, surrounded on both sides by a softer metal. The harder inner layer is preferably a perforated layer, which allows for the junction of the two softer layers together through the perforations. The sandwich layers of metal are explosively welded together. This results in a much stronger cutting tool.

In the simplest form of the second process, no preformed hard, perforated, central layer is utilized; rather the hard central layer is formed by drilling or etching pits or cutting or stamping slots in the lower lamination, which are then filled with extremely hard particles, e.g., tungsten carbide, ceramic dusts, or diamond or mixtures of such compositions. For example, tungsten carbide grit may be mixed with ceramic dust or mineral crystals. In addition, other materials, with characteristics other than hardness, could also be included to improve tool function in desired applications. The upper lamination is then explosion welded onto the lower; the pits retaining their hard particles in place, against the force of the explosion generated plasma jet. This results in the very strong bonding of metal to metal, alternating with regions of integral incorporation of the hard particles into a central layer, which forms the working edge.

The preferred cutting tool is made with layers of like metals. However, dissimilar metals may alternatively be used. Most importantly, however, in either case, the small hard particles (or the hard layer) wear(s) more slowly than the surrounding softer metal. Therefore they (it) will constantly present a sharp edge on the tool to the work and the sharp edge will be continually sharpened as the blade wears. The cutting tool in accordance with the present invention can be constructed and used with multiple laminations, such as a cutting tool with three, four, or five layers of metal.

The foregoing and other features, utilities and advantages of the invention will be apparent from the following more particular description of the preferred embodiments of the invention as illustrated in the accompanying drawings.

BRIEF DESCRIPTION OF THE DRAWING

FIG. 1 is an exploded view of a cutting tool of the present invention wherein the inner layer has perforations.

FIG. 2 is a preferred embodiment of a cross-section of the blade of the present invention.

FIG. 3 is an alternative embodiment of a cross-section of the blade of the present invention.

FIG. 4 is an alternative embodiment of a cross-section of the blade of the present invention.

FIG. 9 is an alternative embodiment wherein there is no preformed central hard layer, but drilled or etched pits filled or partially filled with extremely hard particles, which allow the direct incorporation of these particles within the center of the tool, effectively forming a hard perforated central lamination as a result of the process of explosive welding of the two adjacent laminations.

FIG. 10 is a view of the embodiment shown in FIG. 9, with the welding complete, and particles incorporated into the center of the tool, alternating with areas where the outer layers are joined like metal to like metal.

FIG. 11 is a view of the embodiment shown in FIG. 10, from the side, illustrating the exposed hard particle in the cutter edge.

DETAILED DESCRIPTION OF THE PREFERRED EMBODIMENT

Figure 5:
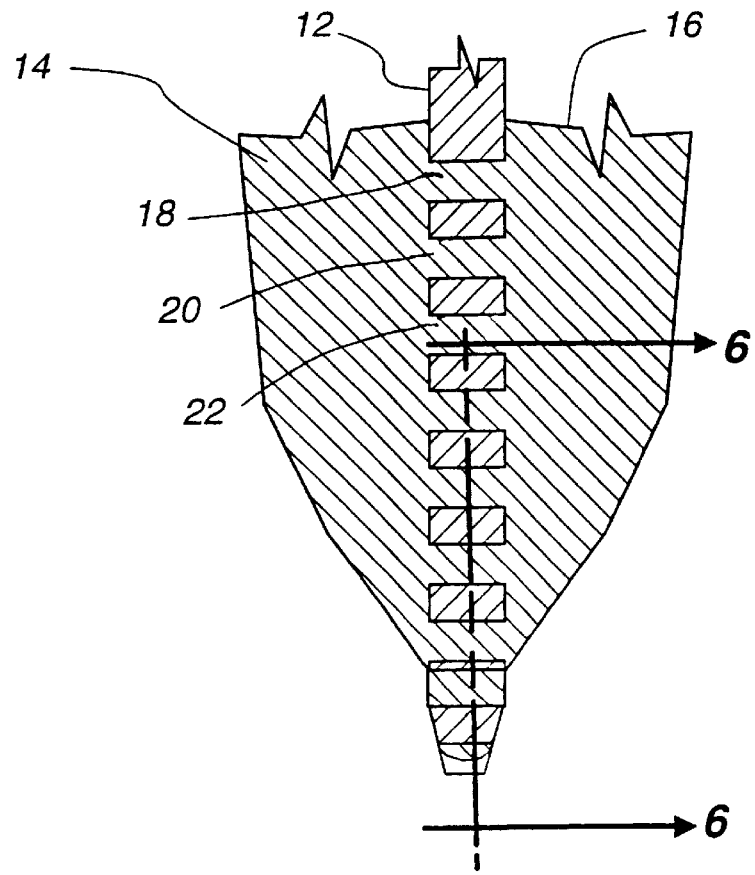
FIG. 5 is a cross section of the cutting tool of the present invention illustrating the perforated inner layer and the fusing of the outer layers.

FIG. 1 illustrates a general perspective view of a cutting blade 10 according to the present invention. There is a hard inner layer 12 which is surrounded by two softer alloys 14 and 16. The inner layer 12 has exemplary perforations 18, 20 and 22. Typically, the hard inner layer 12 is a hard material such as tungsten carbide, or other hard material. The outer layers 14 and 16 may be formed of aluminum, steel or some other material which is less hard than the central material 12. The perforated middle layer 12 has perforations 18, 20 and 22 as an avenue for the outer layers 14 and 16 to fuse together. This fusing is described in greater detail below.

The purpose of having a hard central layer laminated to two softer metals on the side followed by possible softer metals on the edges is to form a self-sharpening tool which can successfully combine the best characteristics of the various laminations into the finished tool. Instead of a tool which is a compromise between hardness, toughness, and flexibility, the tool can be extremely hard where that is useful, tough where that characteristic is useful, and flexible where that characteristic is useful. FIG. 2 discloses a typical wear pattern for the cutting tool. Since the softer materials wear more quickly, they will wear down along the outer sides at a quicker rate than the middle hard material. Thus the middle hard material will have an exposure of a sharp edge shown generally as 19. An example of this would be the use of a laminated cutting tool according to the present invention as a lawnmower blade. These blades typically must not be too hard, or the more brittle hard steel will likely shatter when the blade strikes an object such as a half buried rock. Consequently, these blades do not hold an edge very well, require frequent sharpening, and cause significantly decreased performance of the cutting tool and increased fuel consumption when the lawnmower blade is very dull.

Similar circumstances apply to all industrial edged tools wherein the tool is working on something which either may be very hard, or which may be heterogeneous in hardness, such as a tool for mining or excavating which must dig through materials which will vary from soft earth to very hard rock. Existing tools strong enough to cope with the shocks of working in heterogeneous substrates will typically wear down quickly.

Making a lawnmower blade of two layers of soft material such as a soft steel with a completely integrated thin lamination of tungsten carbide in the middle would lead to a perpetually self-sharpening blade. The steel would provide the necessary strength, mass and elasticity and the carbide would provide the hardness that is necessary for a sharp cutting edge. A very thin carbide lamination would wear more slowly than the steel, so that it protrudes slightly, forming an effective sharp edge. In manufacturing and when necessary after heavy use, a diamond based sharpening tool could be used to restore a perfect edge.

It is possible using this invention to form mass-produced stock sheets of laminated metal, which can be further worked; both into simple tools such as knives, lawnmower blades, and razor blades; and into the complex shapes required by some cutting tools; e.g., chain saw teeth, saw blades and power mining tools. Such further forming and working may require use of many metallurgical processes, including but not limited to welding, reheating, forging, annealing, and tempering.

Industrial and societal benefits of the present invention would be enormous; and would include decreased fuel consumption, decreased down time, increased efficiency of sharp tools, increased life of tools, and decreased waste of materials in tool manufacture.

Prior to the present invention, functional and economic incorporation of a thin hard lamination into a cutting tool has never been adequately performed.

FIG. 2 discloses a preferred composite or laminated structure wherein the cutting tool has three layers of laminated material. In the preferred embodiment the inner layer 12 is tungsten carbide and the outer layers 14 and 16 are hardened steel. The cutting tool 10 is sharpened such that a cutting edge is exposed at one end 19. The softer metals 14 and 16 wear at a faster rate than the harder, inner layer 12, thus resulting in a self sharpening cutting tool.

FIG. 3 discloses an alternative embodiment wherein there are five layers in the composite structure. Additional outer layers of material 24 and 26 have been added. The order of hardness of the material would be that layer 12 would be the hardest, and would typically be tungsten carbide or other material of extreme hardness. The next layers 14 and 16 would be a softer material, possibly some type of hardened steel, while finally the outer layers 24 and 26 would be yet a softer material, such as aluminum, mild steel or duraluminum. This would result in a self sharpening cutting tool. Again, the central layer 12 would preferably have perforations per the embodiment of the present invention above described, thus resulting in fusing of layers 14 and 16 thus locking the central layer 12 to the adjacent layers 14 and 16. The layers 24 and 26 could be fused to layers 14 and 16 respectively through known welding techniques or the novel explosive welding technique disclosed herein and described below or through perforations through the assembled laminate 14–12–16.

FIG. 4 is yet another embodiment wherein an asymmetrical composite is created. This could be used as a chisel or other cutting tool. The lay-up could be similar to that shown in FIG. 3 without layer 24.

Figure 6:
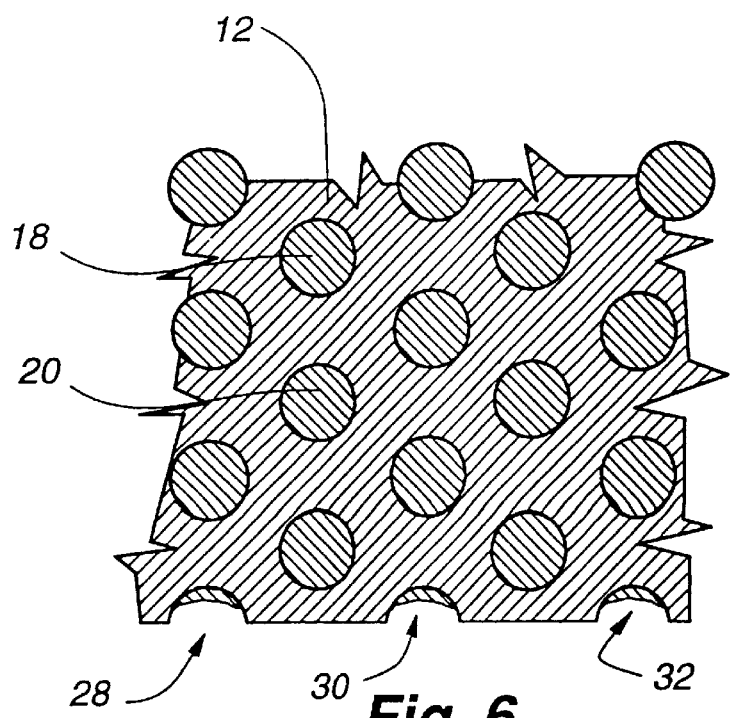
FIG. 6 is an enlarged view of the middle perforated layer taken along lines 6—6 in FIG. 5.

The present invention preferably utilizes a middle hard layer. The middle layer may be solid or perforated. An example would be a perforated tungsten carbide layer, wherein the perforations are preferably uniform across the layer. This is shown in FIGS. 1, 5 and 6 wherein the perforations are achieved preferably by the use of a laser, which would cut through the hardened tungsten carbide or other hardened metal material. This type of perforation creation technology is well-known. However, other methods could be used to perforate the hardened material that are well-known to one skilled in the art, including punching, drilling, casting, photo etching, photo deposition and sputtering. The perforation process will depend on the size of the perforation required as well as other factors.

Another method of manufacture for the perforated hard central laminate layer would be the use of an expanded metal route where a sheet of metal is stamped with slits and pulled on two axes to expand the sheet into a grid with diamond shaped holes. This technique results in a sheet which is not entirely flat, but this should be inconsequential since the sheets being dealt with will normally be extremely thin and they could be worked flat after expansion or in many cases the explosion welding process would achieve the flattening.

It is also possible that a hard layer that is intentionally not entirely flat could produce a blade with superior performance. Most types of saw blades utilize a plurality of cutting tool elements called teeth with "set"; i.e. adjacent teeth, bent in opposite directions to widen the kerf, or cut, so that the narrower blade will not bind as the saw advances. The present invention would make it possible to manufacture blades incorporating a hardened inner layer which would wear into teeth with "set," in any dimension desired. It is likely that many types of cutting edges not previously fabricated with any kind of "set" in the edge could in fact perform in a superior fashion if set could be incorporated into the edge design, even if such set is on a microscopic scale. Such fabrication would be possible with the method in accordance with the present invention.

FIG. 5 discloses a cut cross section illustrating the perforated central laminate layer 12 having two outer layers 14 and 16 fused together and through perforations 18, 20 and 22. The perforations shown in the figures are enlarged from their preferred size, and would preferably be much smaller. The perforations shown in the figures are sized only for clarity of illustration.

The perforation diameters, shapes, densities, and spacings, can be varied, to suit the particular purpose and functionality of each different tool. Preferably, the perforations would range in diameter from about 1 to 10 millimeters. More preferably, the perforations would range from about 2 to 5 millimeters. The spacing would ideally create enough like-to-like junction area to achieve a strong weld between the outer layers but not impair the inner layer function due to too much junction area, i.e., too high a ratio of junction area to inner layer material area. The junction area resulting from the perforations is currently preferably believed to be about 20% to 80% of the surface area of the inner layer. Most preferably, about 30% to 50% of the surface area should be dedicated to the junction areas.

The advantages of using a perforated center layer in the cutting tool in accordance with the present invention are two-fold. The first advantage addresses the fact that it is very difficult to bond or weld unlike materials using conventional technology. As a result, successful economic manufacture of laminated cutting tools has not been achieved, since bonds between dissimilar metals are both extremely difficult to make, and highly liable to failure, and delamination of the tool, when fatigued or corroded. The present invention avoids this basic problem by allowing the bonding or welding of like materials to one another and even dissimilar materials together through the explosive welding technique which generates the bond between adjacent materials at the molecular level.

In looking at FIGS. 5 and 6, the perforations allow the materials of layers 14 and 16 to bond together through the perforations 18, 20 and 22. This bonding through the perforations results in an improved strength of bond between layers 14 and 16 through to the hard inner material 12. In some applications, the outer layers may be a material which may have the same or greater hardness than the inner layer. In addition, for some applications layer 14 could be harder than layer 16, though still similar enough in alloy to allow good bonding, to create a beveled cutting tool.

The second advantage is that as the center layer 12 wears down, the wear pattern generates "saw teeth" in the hard material as it wears. This is illustrated in FIG. 6. FIG. 6 illustrates central perforated layer 12 having perforations 18, 20, etc. As the tool is worn down, the perforations also wear down and create saw teeth shown as 28, 30 and 32. These saw teeth assist in the cutting tool ripping or cutting the intended substrate. Fineness of the teeth is determined by the diameter and spacing of the perforations, which can be microscopic if desired. Finally, the pattern of perforations can be chosen such that there are numerous saw teeth edges or very few, depending on the application. In addition, the shape of the perforations can be varied, from round to oval, to diamond or other shapes; to provide differing sorts of teeth to suit particular uses.

In the preferred embodiment, a provision would be made to ensure the laminated blade is discarded before it becomes so worn as to be dangerously weak for a particular application. One easy way to do this would be to form the blade wherein the central perforated hardened layer only extends a certain portion of the way into the cutting tool. This is shown in FIG. 1. As the central layer 12 gets close to the line 25 there would be wear indicators such as visual, sonic or functional. This would alert the user that the blade is becoming too thin, and replacement should be considered.

Figure 12:
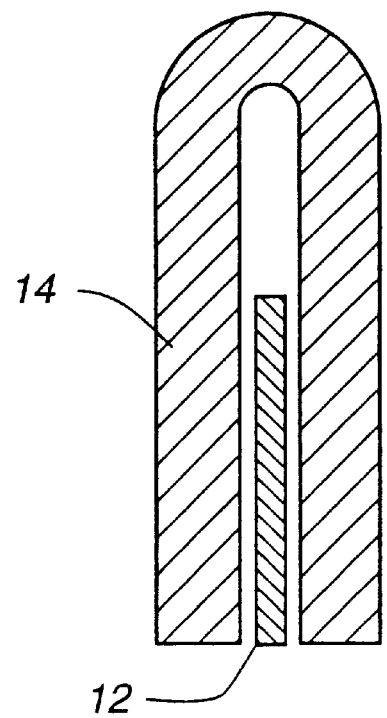
FIG. 12 is a view of an additional aspect of the present invention.
Figure 13:
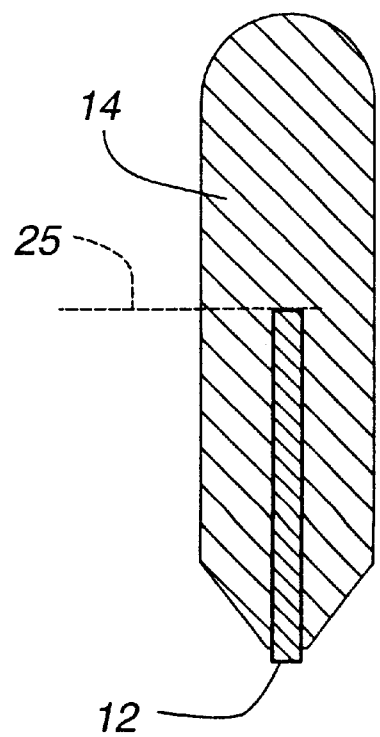
FIG. 13 is a view of an additional aspect of the present invention.

An additional method of forming such a blade with built-in wear indicators and safety would be to form the outer layers of one piece of material, 14, folded over to enclose the hard inner layer 12. This is shown in FIGS. 12 and 13. As in FIG. 1, when the hard layer 12 wears down close to the line 25, wear indicators would alert the user to replace the tool. In addition, because the back of the tool is fabricated of one piece, all danger of delamination is eliminated, and the blade is made substantially stronger and safer, where this is desirable.

One of the welding techniques that could be used for the present invention is "explosion welding." A layer of explosive is deposited on a sheet of metal, which metal is then placed above the sheet of metal to which it is to be "clad," or laminated, or welded. Through controlled detonation of the explosive, the two sheets of metal are driven together with such speed and force that a plasma jet is formed at the point of angular collision of the two sheets. This plasma jet burns away all impurities and metal oxides, leaving clean metal for the junction. Pressures and temperatures generated by the explosion are sufficient to cause the metals to behave like fluids at the point of collision, allowing a junction to form, even of dissimilar metals, on the molecular level.

The technique of explosive welding is believed to have been used only for fabrication of structural materials and not for fabrication of tools subjected to a variety of different stresses during use. While quite dissimilar metals can be joined by this method, such junctions are still subject to eventual failure due to metal fatigue resulting from normal work stress and flexion, and due to corrosion stemming from the inherent electrical properties of dissimilar metal junctions. The present invention renders such failures both less likely, and even irrelevant, when a hard central lamination is contained between two tough outer laminations which are joined directly to each other, like metal to like metal, through perforations in the hard central lamination.

Figure 7:
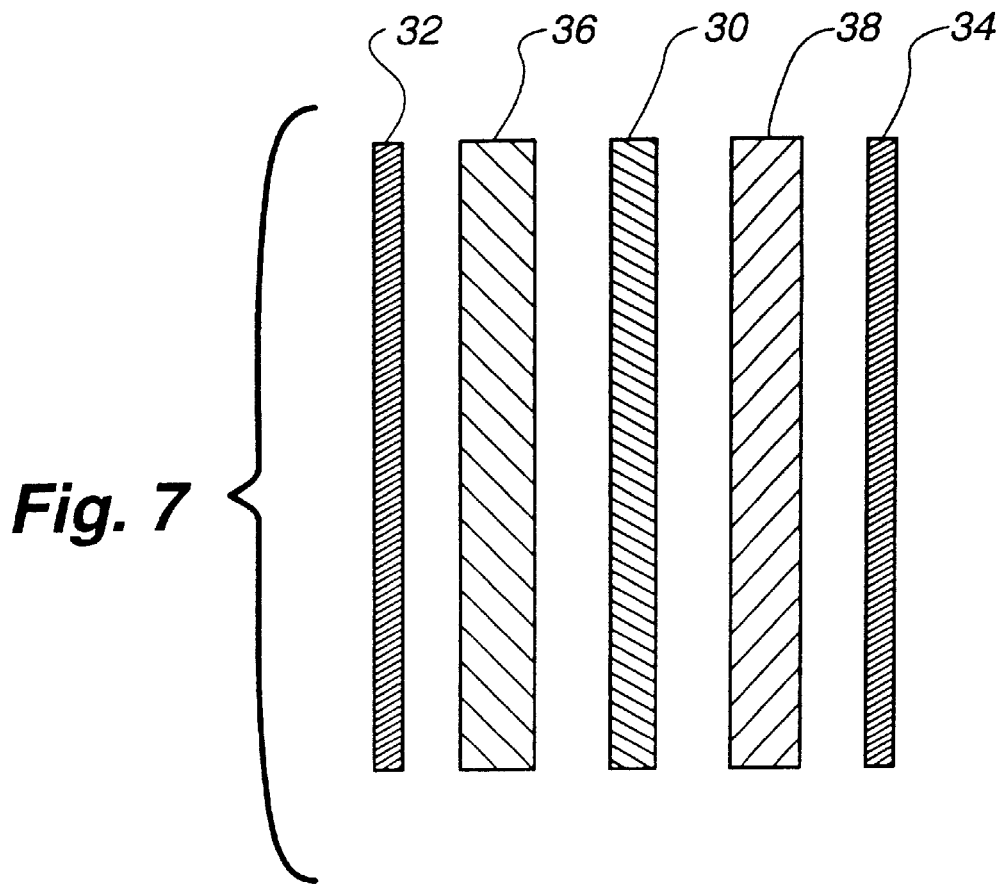
FIG. 7 is a cross-section of a lay up assemblage of laminations of an alternative embodiment of the present invention wherein the lamination occurs through an explosive welding technique.

This is shown in FIGS. 7–11. FIG. 7 illustrates a central lamina 30, having outer lamina 36 and 38, followed by layers of explosive 32 and 34. The central lamina 30 may be perforated or not, depending on particular tool requirements. Several specific pathways for assembly are possible: joining either one layer at a time successively, or all layers may be joined simultaneously in one explosion event, if adequate control is possible for the particular lamination job in hand.

Pressures generated during the explosion joining process range from 100,000 to 600,000 psi; temperatures generated in the plasma jet are extremely hot; i.e., plasma temperature.

Figure 8:
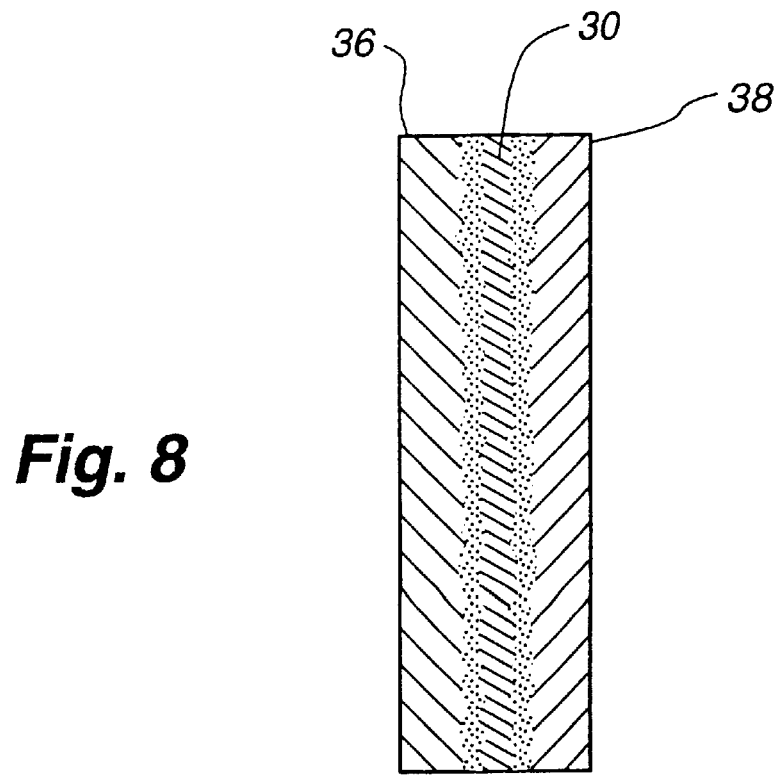
FIG. 8 is a cross-section of an alternative embodiment of the present invention wherein the lamination of the lay up shown in FIG. 7 has occurred through the explosive welding technique.

FIG. 8 illustrates a composite laminate after explosive welding. The explosive has been entirely consumed by the explosion, leaving the metals welded together on or nearly on the molecular level by the heat and turbulence of the explosion.

A method of manufacture that could greatly reduce the cost of fabrication would be to form recesses such as pits, blind bores or slots in any one or more of the facing surfaces of laminations 30, 36, or 38, which would then be filled or partially filled with appropriate particles, e.g., tungsten carbide grit. The recesses, e.g. pits, bores or slots, (hereinafter termed pits inclusively) could be formed by etching, drilling sawing, stamping, casting, or other process. The pits would preferably be deep enough and so shaped as to provide some shelter to the particles from the direct force of the plasma jet formed during explosive welding, so that they tend to remain in place.

The precise shape of the recesses or pits can be tailored for the particular job at hand: the shape of the pit will determine how much of the appropriate particle material is actually retained in the precise region of the pit after explosive welding, and how much of it will be blown out of the pit during the passage of the plasma jet. Pits can be slanted

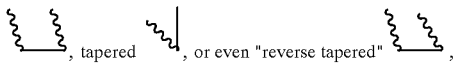

to create specific patterns of turbulence and particle movement or retention during the welding event; resulting in virtually infinite possible variations in final distributions of the hard particles incorporated into the tool.

It will also be possible to intentionally design pits, particles, and explosions so that specific amounts of the particles are blown out of the pits during the welding, said particles then being incorporated into the weld in all areas of the work, including the "non-pit" areas. Minute changes in parameters can be used to generate precisely designed edges, including working "teeth" in the edge.

As the plasma passes over them, the particles would be integrally joined to the surrounding outer laminations, effectively forming a perforated central hard lamination in situ. The pits can also be specifically designed to spill precise portions of the hard particles into the plasma jet, thus spreading them throughout the entire weld. This will also result in a final tool with like metal joined to like metal; the outer laminations joined directly to each other in the same weld that incorporates the hard particles gives the tool the superior performance. If slots are used instead of actual pits or blind bores, their arrangement can be a significant part of the tool design. A preferred pattern would be a crisscross pattern, but other arrangements are easily achievable and thus the particular pattern will be determined by the required performance of the specific tool being designed.

Differing amounts and types and size of particles in the pits would result in differing wear characteristics. This would reduce the cost of fabricating the central hard lamination to the simple procedure of etching and emplacing appropriate hard particles. An advantage of this concept would be that the mixture of types of particles, rather than just one type of particle, could be easily used to improve the effectiveness and functionality of the tool. In the preferred embodiment, tungsten carbide grit could be mixed with ceramic dust or mineral crystals. Other materials, with characteristics other than hardness, could also be included to improve tool performance. Such mixtures of varying particles, metallic and non-metallic, will allow tools to be very specifically "tailored" for optimum performance in their specific work and environment, in a fashion and to a degree not previously possible. Particles of extreme hardness could be mixed with particles of great toughness, e.g., platinum, to achieve a long-wearing edge.

Other methods of retaining the hard particles, or mixtures of particles, in place during the explosive joining will also be possible. These include but are not limited to covering the filled pits with a thin metal foil. Such a foil will shelter particles in the pits from the plasma jet. The foil would preferably be of the same or similar alloy as the outer layers, with the intention of having the foil entirely vaporized by the plasma jet. The metal from the foil thus acts as an integral part of the junction, i.e., acts a sort of metal glue. Any method which will allow the hard particles to remain in place during the passage of the plasma jet, and not interfere with the joining, will serve this function.

Diamond particles may also be introduced into tools through the explosive manner described above. Diamond, as carbon, is susceptible to combustion, but is formed under conditions of great heat and pressure. If the heat and pressure are great enough, and the explosive is carefully chosen to reduce the availability of oxidizing chemicals liable to attack diamond, it is probable that diamond dust could be made to survive the explosive forming, and provide extremely durable edges. One method to protect diamond from oxidation during the explosion would be to coat diamond particles with a protective layer of some material that would either directly provide a physical barrier to oxidizing molecules, or would be a sacrificial layer that by its own oxidation would prevent the oxidizing agents and forces from reaching and/or affecting the diamond structure.

It is also possible that diamond could be incorporated in situ in tools which have already been formed. In other words, this forming process, of using surface pits to hold the particles in place during explosive welding events, can be used to incorporate or embed the diamond in the exterior surface of the formed tool.

Given an explosive of sufficient power, and a containment system capable of generating the requisite pressures, generation of diamond in situ in a formed tool can be accomplished. Basically, the process focuses the force of the explosive collision into the pits with the pits having a shape such as a conical shape so as to concentrate the detonation wave front force of the explosion into the point or base of the pit to generate the diamond. The shape of the pits is critical to formation and placement of the diamond generated by this method. By tailoring the shape of the pits, the direction and speed of the detonation wave front can be controlled, and thus the heat and pressure generated by the explosion can be precisely controlled and focused, creating the exact conditions for diamond formation. The pits may include a conical portion and a cavity at the vertex to accumulate and concentrate the graphite or carbon during diamond formation. The graphite or some other form of carbon particle may also be coated with oxidation barrier to enhance the transformation of the graphite or other non-diamond carbon into diamond. This could enormously increase the efficacy of the tool, and enormously decrease the cost of incorporating diamond during tool manufacture. Further, in situ diamond particles smaller than standard diamond dust may be generated in the tool resulting in a working edge of the tool with unprecedented sharpness and durability.

The method of coating particles to ensure their surviving the explosion can also be applied to many other types of particles besides carbon; thus allowing them to be included in the structure of the tool to lend it specific properties. Many types of particles, metallic and non-metallic, which were previously impossible to include in the working edges or surfaces of tools, will be possible to incorporate with the techniques of the present invention.

FIG. 9 illustrates a tool with two lamina 36 and 38 ready for explosive welding, with the explosive layer 32 positioned atop lamination 38. In this example, lamina layer 30 is omitted. Appropriately shaped pits 41 have been formed in lamination layer 36 facing lamination layer 38 and filled with a mixture 40 of various tailored extremely hard and/or tough particles.

FIG. 10 illustrates this laminated tool after explosive welding; the explosive is gone with the detonation, leaving a layer of hard particles completely incorporated in the tool. Since laminae 36 and 38 are like materials, the bond is very strong. The exemplary embodiment illustrated shows laminar layer 36 and 38 as being unequal in thickness; this is intended to show just one of many possible variations for specific tools, and is not intended to rule out other physical tool configurations.

FIG. 11 is a view along the working edge of this laminated tool, showing the very hard particles exposed by normal wear, forming teeth and providing superior working ability. The size of particles can vary with the need of the tool; from relatively large sizes measured in millimeters down to near molecular sizes.

There are many variations that are possible as far as what materials could be mixed. An example of this is in agricultural cutting applications, wherein a major wear factor is silicon found in many grasses. Designing blades with edges specifically designed to resist silicon wear would enormously improve performance in the life of the blades. Obviously all materials used in this fashion must be capable of withstanding the heat and pressure of the explosion during the welding process. Variations in the explosive welding process itself will prove critical.

Finally, by varying the make-up of the mixtures of particles placed in the pits, it may be possible to form useful and possibly new alloys during the explosion welding step. It is conceivable that alloys unattainable with other fabrication techniques could be achieved by this process, and produce alloys formed in place in the tool.

As an additional part of fabricating superior tools using explosive welding, it should be possible to use a single explosive event both to join two or more metal laminations, and simultaneously to deposit on the outside of the tool a layer or coating resulting from particles suspended in or materials in solution in the explosive itself. Upon detonation, appropriately positioned materials would be driven into the outside surface of the tool, forming coatings that could give tools so coated unique and superior working characteristics.

While the cutting tool and methods of manufacturing the cutting tool have been particularly shown and described with reference to a preferred embodiment thereof, it will be understood by those skilled in the art that various other changes in the form and details may be made without departing from the spirit and scope of the invention. For example, in addition to the variations described above, the laminar layers may be joined by augmenting the explosive welding with, or conducted in the presence of an appropriate adhesive composition to enhance the bonding of particles and the lamina layers. Further, the tool fabricated according to the present invention may more accurately abrade a target material rather than cut or slice it. Thus the present invention may also be applied to abrasive tooling. Accordingly, all such variations, changes and alterations are envisioned as being within the scope of the invention as defined by the following claims.

I claim:

1. A self sharpening laminated cutting blade, said blade comprising:

a first central layer, said central layer comprising a hard material, said central layer including a plurality of perforations extending through said central layer;

at least two second and third outer metal layers, said second and third layer being welded together through at least some of said perforations of said first layer to form a laminate blade;

an additional fourth layer adjacent one of said outer layers, said additional layer comprising a softer metal than said adjacent layer.

2. The blade of claim 1 comprising a fifth layer adjacent said third layer and said fourth layer adjacent said second layer.

3. A self sharpening laminated cutting blade, said blade comprising:

a first central layer, said central layer comprising a hard material, said central layer including a plurality of perforations extending through said central layer and wherein said first layer has a marker indicating said central layer is nearing its terminal end;

at least two second and third outer metal layers, said second and third layer being welded together through at least some of said perforations of said first layer to form a laminate blade.

4. A method of forming a cutting tool, the method comprising:

forming recesses in a first layer of a first material;

placing particles of a second material in said recesses;

covering said recesses with a second layer of a third material to form a composite of said first, second, and third materials; and applying heat and pressure to said composite until said first and second materials are substantially welded together and said second layer is substantially vaporized.

5. A method of forming a cutting tool, the method comprising:

forming recesses in a first layer of a first material;

placing particles of a second material in said recesses, the second material being oxidizable;

covering said particles with a second layer of a third material to form a composite of said first, second, and third materials, said second layer being a sacrificial layer that prevents the oxidation of said second material; and applying heat and pressure to said composite until said first and second materials are substantially welded together and said second layer is substantially vaporized.

6. The method according to claim 5 wherein the particles are carbon.

* * * * *